United States Patent
Kobayashi et al.

(10) Patent No.: US 7,908,434 B2
(45) Date of Patent: Mar. 15, 2011

(54) RAID APPARATUS, CACHE MANAGEMENT METHOD, AND COMPUTER PROGRAM PRODUCT

(75) Inventors: Akihito Kobayashi, Kawasaki (JP); Katsuhiko Nagashima, Kawasaki (JP); Hidenori Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 11/589,860

(22) Filed: Oct. 31, 2006

(65) Prior Publication Data

US 2007/0294475 A1 Dec. 20, 2007

(30) Foreign Application Priority Data

Jun. 16, 2006 (JP) .................................. 2006-167665

(51) Int. Cl.
*G06F 12/00* (2006.01)

(52) U.S. Cl. ............ 711/113; 711/4; 711/100; 711/111; 711/112; 711/114; 711/115; 711/161; 711/162; 710/5; 710/6; 710/39; 710/40; 710/52; 710/240; 710/244; 710/263; 710/264; 718/102; 718/103

(58) Field of Classification Search .............. 711/4, 100, 711/111–114, 115, 161–162; 714/5–6; 710/5–6, 710/39–40, 52, 240, 244, 263–264; 718/102–103
See application file for complete search history.

(56) References Cited

U.S. PATENT DOCUMENTS

| | | | | |
|---|---|---|---|---|
| 5,220,653 A | * | 6/1993 | Miro | .............................. 718/107 |
| 6,233,700 B1 | | 5/2001 | Uchida | |
| 6,253,262 B1 | * | 6/2001 | Rozario et al. | .................. 710/39 |
| 2003/0149839 A1 | | 8/2003 | Kuwata | |

FOREIGN PATENT DOCUMENTS

| | | |
|---|---|---|
| JP | 5-303528 | 11/1993 |
| JP | 11-338775 | 12/1999 |
| JP | 2003-228461 | 8/2003 |

* cited by examiner

*Primary Examiner* — Tuan V Thai
*Assistant Examiner* — Zhuo H Li
(74) *Attorney, Agent, or Firm* — Staas & Halsey LLP

(57) ABSTRACT

A cache managing unit creates a list of elements corresponding to each data block arranged based on a priority of writing data blocks to a magnetic disk apparatus, and when a group of elements corresponding to data blocks to be written to the same magnetic disk apparatus exists, provides a link connecting elements at both ends of the group. A write control unit searches, upon selecting a data block for writing, elements belonging to the list in descending order of priority, and if a link is set at an element corresponding to a data block to be written to a magnetic disk that cannot perform a writing, follows the link to search a subsequent element.

9 Claims, 17 Drawing Sheets

RAID APPARATUS, CACHE MANAGEMENT METHOD, AND COMPUTER PROGRAM PRODUCT

BACKGROUND OF THE INVENTION

1. Field of the Invention

The present invention relates to a RAID apparatus, a RAID control program, and a cache management method that temporarily store a data block to be written to a magnetic disk in a cache, and more particularly, to a RAID apparatus, a RAID control program, and a cache management method that can suppress increase in processing time of managing a cache, even when it is a large capacity cache.

2. Description of the Related Art

Redundant arrays of independent disks (RAID) apparatuses and the like generally include a cache for increasing reply speed in regard to requests from a host. For example, when a host makes a request to write a data block, the RAID apparatus stores the data block of the write request in the cache, and at this stage replies by informing the host that the write is complete. The RAID apparatus then executes a process of writing to a magnetic disk apparatus at a predetermined timing.

By delaying writing to the magnetic disk apparatus, which has a slower operating speed than a central processing unit (CPU) of the host, and replying that writing is completed when storing in the cache in this manner, the process waiting time of the host is reduced and the performance of the overall system is enhanced.

The cache also increases the reply speed in regard to read requests from the host, and, while it is preferable to store as many data blocks as possible in the cache to enhance performance, the capacity of the cache is limited. Accordingly, many RAID apparatuses effectively use a limited capacity of a cache by managing data blocks stored in the cache based on least recently used (LRU) logic (for example, see Japanese Patent Application Laid-open Nos. 2003-228461 and H11-338775).

Data accesses by various programs that operate on a host are known to have locality, and there is a higher possibility that data blocks which have not been stored for a long time in the cache will be accessed again from the host. By using the LRU logic, priority can be given to data blocks having a low possibility of an access request from the host in removing them from the cache, enabling the limited capacity of cache to be used effectively.

Recently, however, there are increasing demands to enhance the performance of RAID apparatuses, and RAID apparatus including large capacity caches of 100 gigabytes or more are appearing. Although processing time of data block management based on the LRU logic has been conventionally as small as to be negligible, the large capacity of such caches and the increasing numbers of data blocks stored in them are tending to considerably influence the processing performance.

SUMMARY OF THE INVENTION

It is an object of the present invention to at least partially solve the problems in the conventional technology.

A RAID apparatus according to one aspect of the present invention temporarily stores a data block to be written to a magnetic disk apparatus in a cache. The RAID apparatus includes a cache managing unit that creates a list in which elements corresponding to each data block is arranged according to a priority for writing the data blocks temporarily stored in the cache to the magnetic disk apparatus, and when a group of elements corresponding to data blocks to be written to a same magnetic disk apparatus exists in the list, provides a link that connects elements at both ends of the group; and a write control unit that searches, upon selecting a data block as a target for writing to the magnetic disk apparatus, the elements belonging to the list in descending order of priority, and if a link is set at an element corresponding to a data block of which a write destination is a magnetic disk that cannot perform a writing, follows the link to search a subsequent element.

A computer program product according to another aspect of the present invention includes a computer usable medium having computer readable program codes embodied in the medium that when executed causes a computer to execute cache managing including creating a list in which elements corresponding to each data block is arranged according to a priority for writing the data blocks temporarily stored in the cache to the magnetic disk apparatus, and providing, when a group of elements corresponding to data blocks to be written to a same magnetic disk apparatus exists in the list, a link that connects elements at both ends of the group; and write controlling including searching, upon selecting a data block as a target for writing to the magnetic disk apparatus, the elements belonging to the list in descending order of priority, and following, if a link is set at an element corresponding to a data block of which a write destination is a magnetic disk that cannot perform a writing, the link to search a subsequent element.

A method according to still another aspect of the present invention is for managing a cache that temporarily stores a data block to be written to a magnetic disk apparatus. The method includes list organizing including creating a list in which elements corresponding to each data block is arranged according to a priority for writing the data blocks temporarily stored in the cache to the magnetic disk apparatus, and providing, when a group of elements corresponding to data blocks to be written to a same magnetic disk apparatus exists in the list, a link that connects elements at both ends of the group; and write controlling including searching, upon selecting a data block as a target for writing to the magnetic disk apparatus, the elements belonging to the list in descending order of priority, and following, if a link is set at an element corresponding to a data block of which a write destination is a magnetic disk that cannot perform a writing, the link to search a subsequent element.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings.

Figure 17:
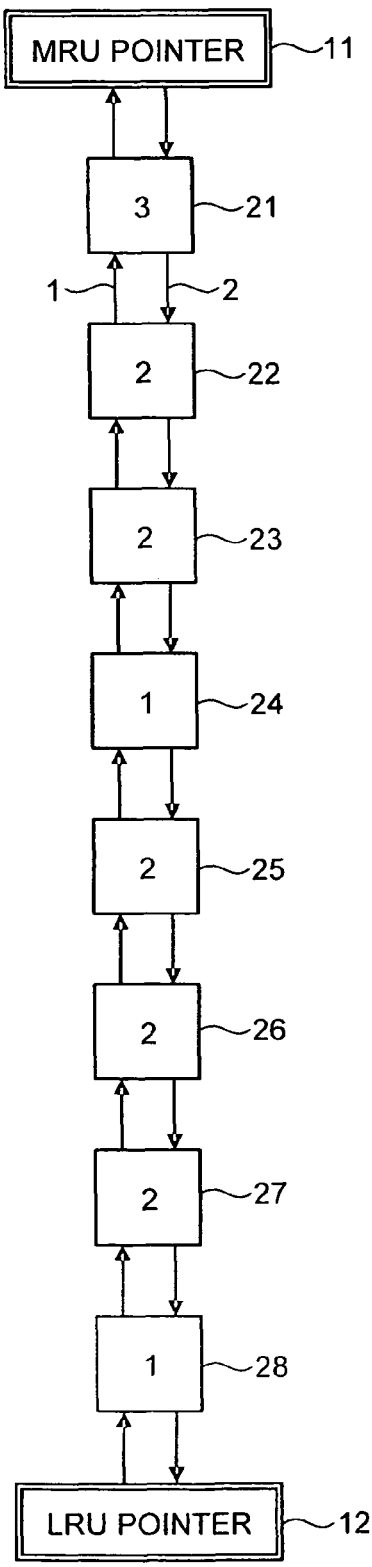
FIG. 17 is an explanatory diagram of a summary of a conventional cache management method.

A summary of a cache management method in a conventional RAID apparatus will be explained first. FIG. 17 is an explanatory diagram of the summary of the conventional cache management method, and depicts a list (hereinafter, "dirty link") which manages a write sequence of data block (hereinafter, "dirty blocks") which are stored in the cache and have not yet been written to a magnetic disk apparatus even though a write request from a host has been made.

As shown in FIG. 17, the dirty link is formed by bidirectionally connecting management blocks 21 to 28 corresponding to the dirty blocks using next dirty pointers 1 and previous dirty pointers 2. The end of the management block 21 side connects to a most recently used (MRU) pointer 11, and the end of the management block 28 side connects to an LRU pointer 12.

The MRU pointer 11 points to a management block that corresponds to a data block for which an access request is most recently made from the host. The LRU pointer 12 points to a management block that corresponds to a data block for which the longest time has elapsed since an access request has been made from the host.

The management blocks 21 to 28 store management information of corresponding data blocks, and are listed such that, the more recent the access request for the corresponding data block, the nearer the management block is arranged to the MRU pointer 11. The next dirty pointers 1 connect the management blocks in a direction from the LRU pointer 12 toward the MRU pointer 11, and the previous dirty pointers 2 connect the management blocks in a direction from the MRU pointer 11 toward the LRU pointer 12.

The management information stored by the management blocks 21 to 28 includes disk numbers for identifying the magnetic disk apparatuses that constitute the write destinations of the corresponding data blocks. The disk numbers stored by the management blocks 21 to 28 are respectively "3", "2", "2", "1", "2", "2", "2", and "1". These disk numbers can also represent a virtual magnetic disk apparatus that includes a plurality of physical magnetic disk apparatuses.

The dirty link is used in selecting data blocks for writing to a magnetic disk apparatus when the capacity of the cache is nearing its limit and the like. Specifically, selection of data blocks for writing is made by giving priority to those corresponding to management blocks arranged near the LRU pointer 12, and management blocks corresponding to data blocks that have been written are deleted from the dirty link.

In selecting a data block for writing, consideration is given to the load status of the magnetic disk apparatus forming the write destination. That is, a data block whose write destination is a magnetic disk apparatus that already has a heavy concentration of write processes, and a high load, is deleted from the process targets.

Suppose that two data blocks need to be written to a magnetic disk apparatus that corresponds to disk number "2" and has a high load. The dirty link is scanned from a position nearest to the LRU pointer 12, and the management block 28 is selected. Since the disk number "1" stored by the management block 28 corresponds to a magnetic disk apparatus whose load is not problematic, the data corresponding to the management block 28 is the first one selected as a process target.

The management block 27 is then selected. Since the disk number "2" stored by the management block 27 corresponds to a magnetic disk apparatus with a high load, the data block corresponding to this management block does not become a process target. The subsequently selected the management blocks 26 and 25 store disk number "2", and their corresponding data blocks are also not process targets.

The management block 24 is then selected. Since the disk number "1" stored by the management block 24 corresponds to a magnetic disk apparatus whose load is not problematic, the data corresponding to the management block 24 becomes the second one selected as a process target.

While this example requires a superfluous process of skipping through the three consecutive management blocks 25 to 27 having a disk number of "2", this degree of increase in the processing volume does not affect the processing performance. However, when accesses are concentrated on a specific magnetic disk apparatus in a RAID apparatus with a large capacity cache, there can be many thousands of consecutive management blocks having the same disk numbers in the dirty link. If it becomes necessary to skip through them, performance will deteriorate considerably.

Figure 1:
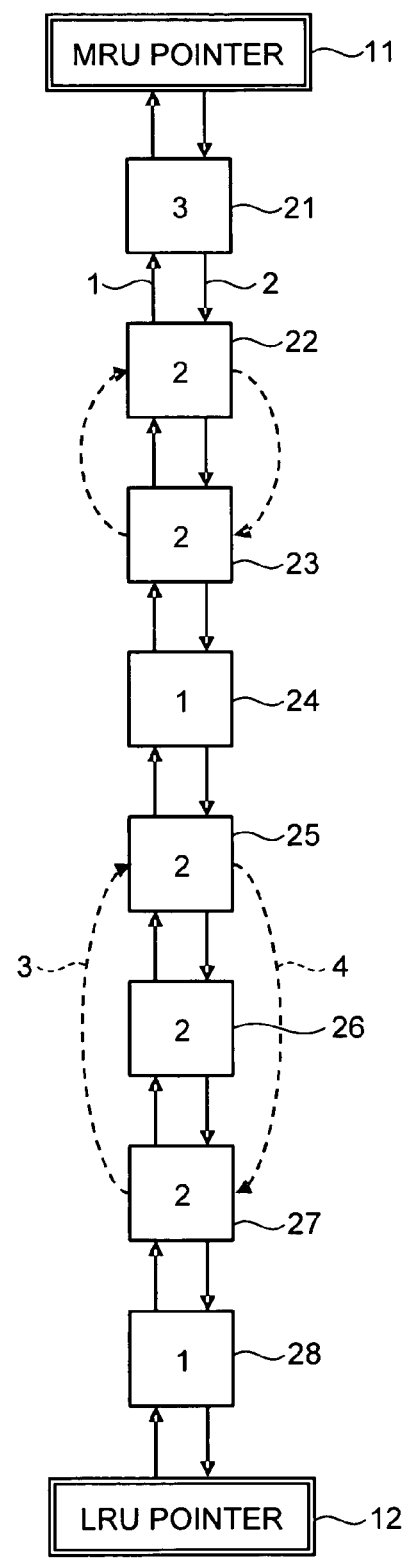
FIG. 1 is an explanatory diagram of a summary of a cache management method according to an embodiment of the present invention.

A summary of a cache management method in a RAID apparatus according to the present embodiment will be explained next. FIG. 1 is an explanatory diagram of the summary of the cache management method. In a dirty link shown in FIG. 1, the management blocks 21 to 28 are arranged in the same order as in FIG. 17.

As shown in FIG. 1, in addition to the next dirty pointers 1 and the previous dirty pointers 2 that bidirectionally connect the individual management blocks, the cache management method of the present embodiment uses a next skip pointer 3 and a previous skip pointer 4 to bidirectionally connect both ends of consecutive management blocks having the same disk numbers.

The next skip pointer 3 connects both ends of consecutive management blocks having the same disk numbers in the direction from the LRU pointer 12 toward the MRU pointer 11. The previous skip pointer 4 connects both ends of consecutive management blocks having the same disk numbers in the direction from the MRU pointer 11 toward the LRU pointer 12. In the explanation below, a bidirectional connection using the next skip pointer 3 and the previous skip pointer 4 is abbreviated as "skip link".

In the example of FIG. 1, the next skip pointer 3 connects the management block 27 and the management block 25, and also connects the management block 23 and the management block 25. The previous skip pointer 4 connects the management block 25 and the management block 27, and also connects the management block 22 and the management block 23.

As in FIG. 17, suppose that two data blocks need to be written when a magnetic disk apparatus corresponding to a disk number of "2" has a high load. By scanning a dirty link from a position nearest to the LRU pointer 12, the management block 28 is selected first. Since the disk number "1" stored by the management block 28 corresponds to a magnetic disk apparatus whose load is not problematic, the first data block selected as a process target is the one corresponding to the management block 28.

The management block 27 is then selected. Since the disk number "1" stored by the management block 27 corresponds to a magnetic disk apparatus with a high load, the data block corresponding to this management block does not become a process target.

In the cache management method according to the present embodiment, when the magnetic disk apparatus corresponding to a disk number stored by one management block has a high load and the next skip pointer 3 of that management block is pointing to another management block, the other management block is selected by following the next skip pointer 3.

Since the magnetic disk apparatus corresponding to the disk number "2" stored by the management block 27 has a high load and the next skip pointer 3 is pointing to the management block 25, the next management block selected is the one that the next dirty pointer 1 of the management block 25 is pointing to, namely the management block 24.

Since the disk number "1" stored by the management block 24 thereby selected is that of a magnetic disk apparatus whose load is not problematic, the data block corresponding to the management block 24 becomes the second data block to be selected as a process target.

Thus in the cache management method of the present embodiment, a cluster of management blocks having the same disk numbers can be collectively skipped by using a skip link. Therefore, even when accesses are concentrated on a specific magnetic disk apparatus in a RAID apparatus with a large capacity cache, forming a large cluster of consecutive management blocks having the same disk numbers, a dirty link can be scanned at high speed and performance deterioration of the RAID apparatus can be suppressed.

Figure 2:
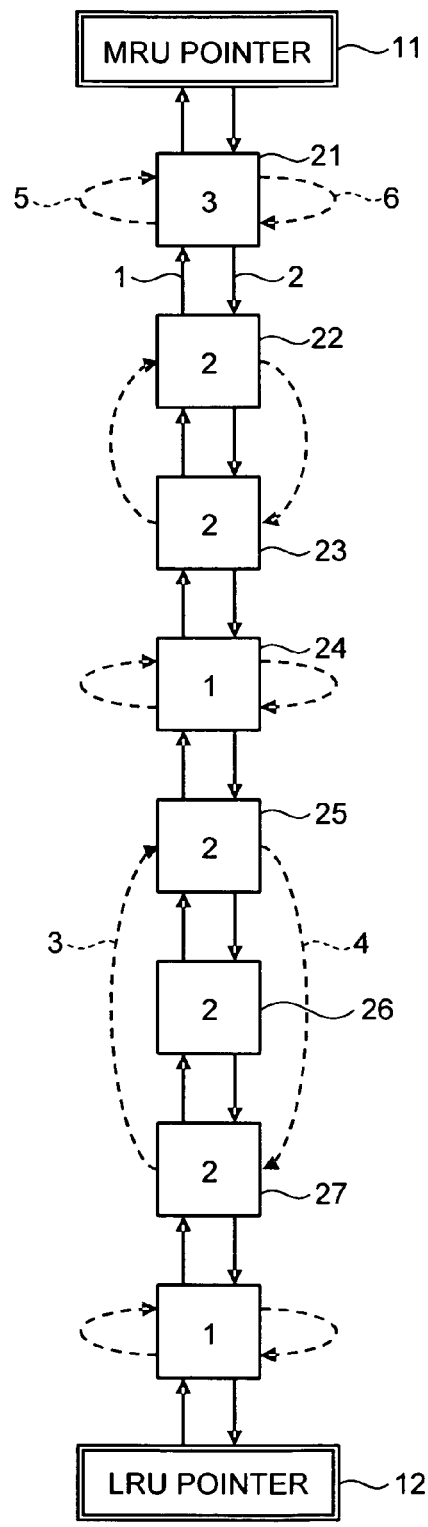
FIG. 2 is a modified example of the cache management method according to the present embodiment.

While in the example of FIG. 1, both ends of consecutive management blocks having the same disk numbers are connected by a skip link, in FIG. 2, a next skip pointer 5 and a previous skip pointer 6 can be set such that they point to a management block having a disk number that is different from both the preceding and subsequent management blocks.

By setting the next skip pointer 5 and the previous skip pointer 6 to a management block which is not included in a cluster of management blocks having the same disk numbers in this manner, all the management blocks become related to one of the skip links. This facilitates processing, for example, when adding a new management block to a dirty link.

Figure 3:
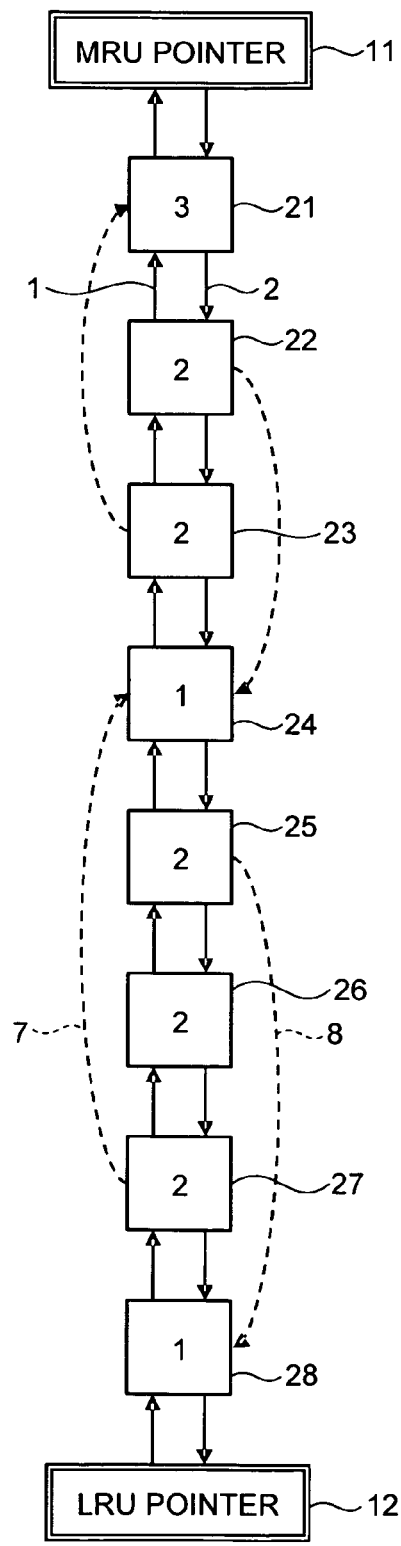
FIG. 3 is another modified example of the cache management method according to the present embodiment.

Furthermore, as shown in FIG. 3, a next skip pointer 7 and a previous skip pointer 8 can be set such that they point to a next management block at another end of consecutive management blocks having the same disk numbers. By pointing to the next management block in this manner, when searching a dirty link by following the skip link, it becomes possible to select a next management block after this cluster while omitting one step by not using the next dirty pointer 1 or the previous dirty pointer 2.

Figure 4:
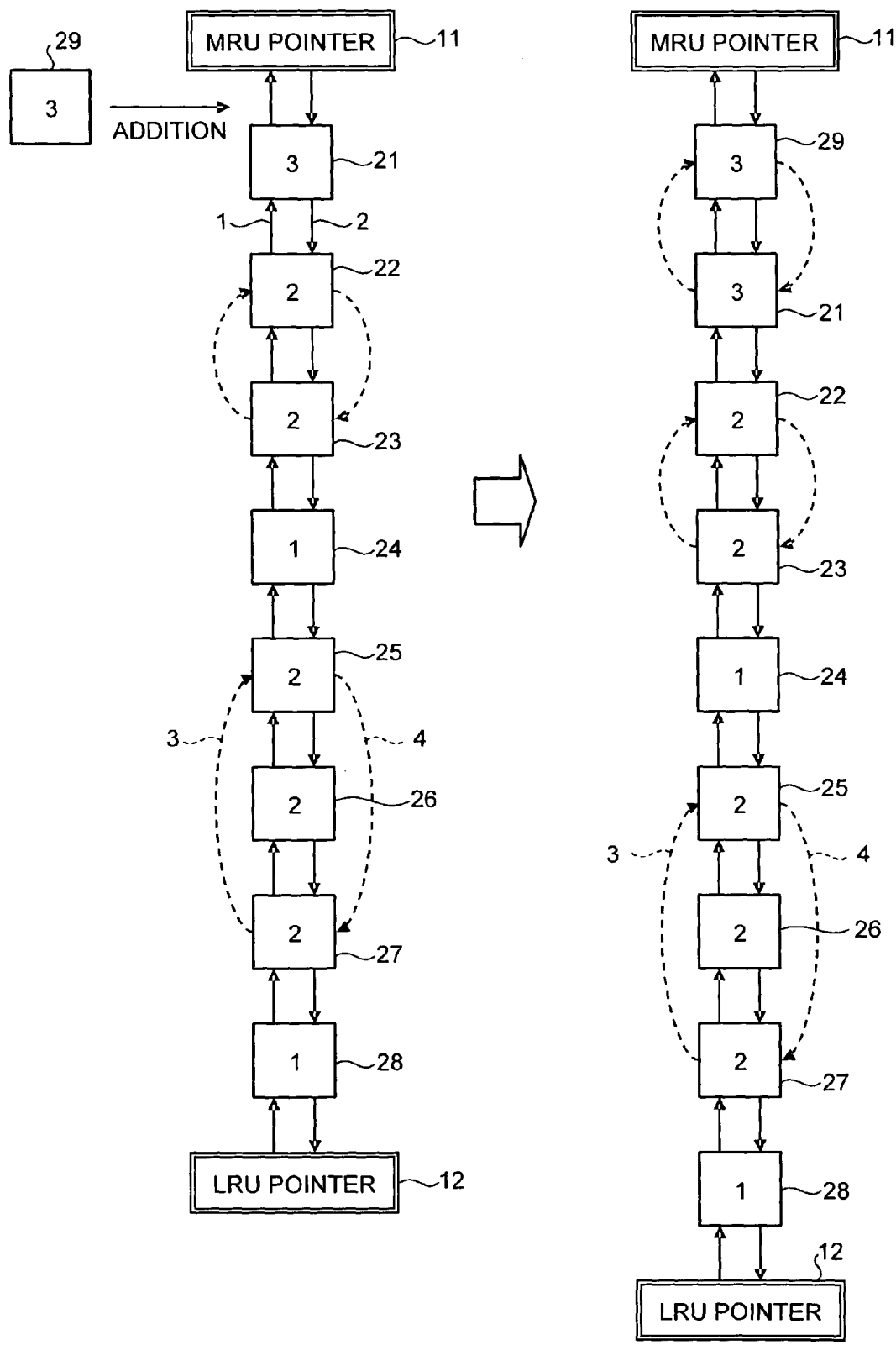
FIG. 4 depicts an operation when adding a management block to a dirty link.

A summary of operations when adding and deleting management blocks to and from the dirty link shown in FIG. 1 will be explained next. FIG. 4 is an operation when adding a management block to a dirty link. In FIG. 4, a management block 29 having a disk number of "3" is added to the dirty link shown in FIG. 1.

The management block 29 is added at a position nearest to the MRU pointer 11 of the dirty link according to the LRU logic. In this example, since the disk number "3" stored by the management block 29 matches the disk number "3" stored by the adjacent management block 21, a skip link is newly set between the management block 29 and the management block 21.

When the disk number stored by the management block added to the dirty link matches the disk number stored by the adjacent management block, and no skip link is set at the adjacent management block, a skip link is newly set between the management block added to the dirty link and the adjacent management block.

When the disk number stored by the management block added to the dirty link matches the disk number stored by the adjacent management block, and a skip link is set at the adjacent management block, a skip link that includes the added management block is reset for the cluster of management blocks corresponding to that skip link.

For example, in FIG. 4, when the management block 22 stores a disk number of "3" and a skip link is set between the management block 21 and the management block 22, after adding the management block 29, a skip link is set between the management block 22 and the management block 29.

If the disk number stored by the management block added to the dirty link does not match the disk number of the adjacent management block, no skip link is set to the added management block.

The cache management method according to the present embodiment is more efficient in searching the dirty link when management blocks having the same disk numbers exist consecutively in the dirty link than when they exist randomly. Accordingly, instead of adding a new management block at a position nearest to the MRU pointer 11 of the dirty link, a new management block can be inserted midway along the dirty link such that management blocks having the same disk numbers are arranged consecutively.

Figure 5:
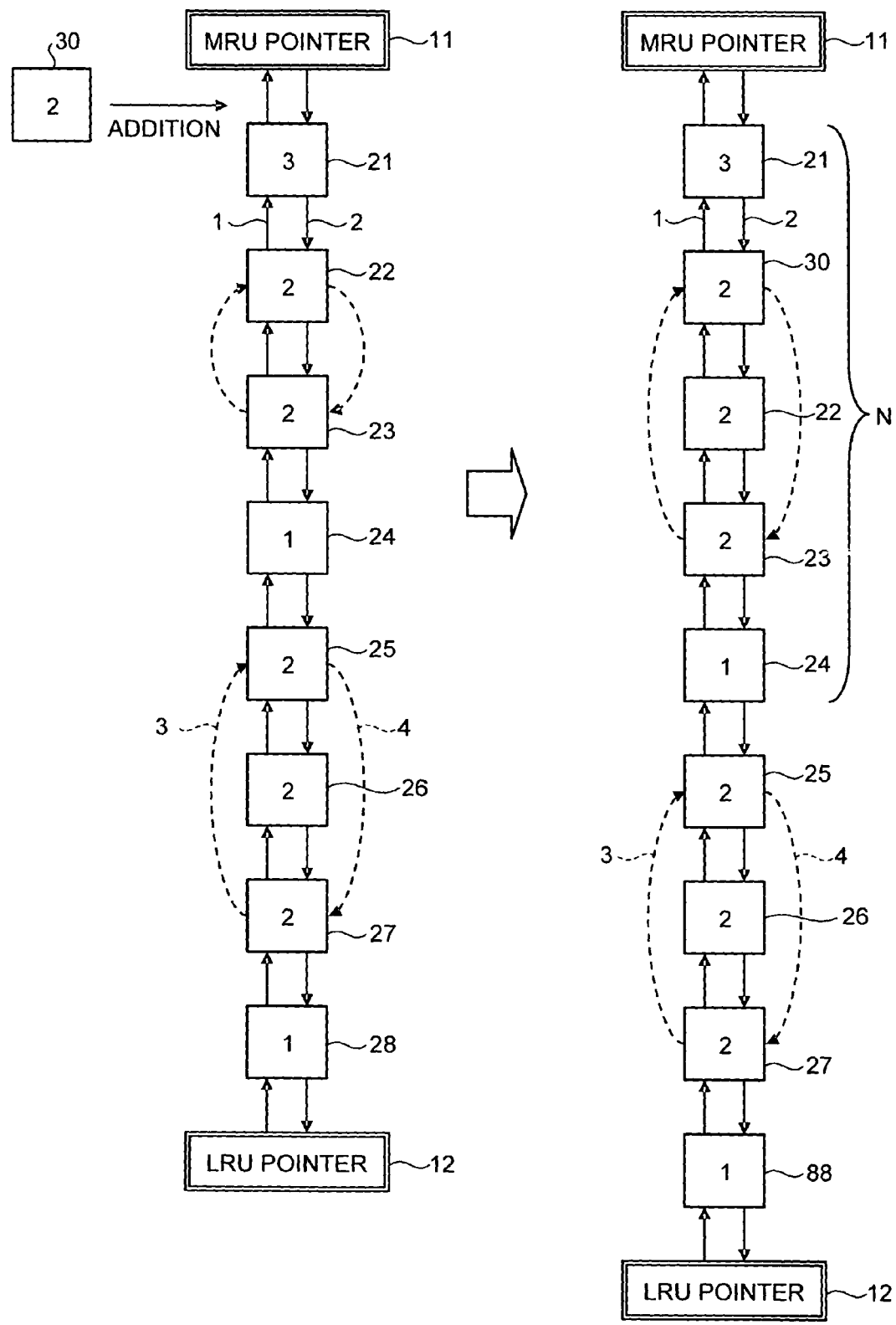
FIG. 5 depicts an operation when inserting a management block into a dirty link.

FIG. 5 depicts an operation when inserting a management block into a dirty link. In FIG. 5, a management block 30 has a disk number of "2", and is inserted into the dirty link shown in FIG. 1.

When inserting a management block into the dirty link, the dirty link is scanned from the side near the MRU pointer 11, the insertion position being before a management block that stores the same disk number. Since performance can deteriorate if the entire dirty link is scanned, scanning is limited to an n-th management block from the side near the MRU pointer 11. When a management block storing the same disk number is not discovered by the n-th management block, the management block is inserted at a position nearest to the MRU pointer 11 as in the example of FIG. 4.

The value of N can be fluctuated dynamically according to the load status of the RAID apparatus, or it can be determined according to the number of magnetic disk apparatuses and the like connected to the RAID apparatus.

In the example of FIG. 5, since the management block 22 storing a disk number of "2" exists within the N range, the management block 30 is inserted before the management block 22, and a skip link is set between the management block 23 and the management block 30, which form the ends of the cluster of management blocks storing disk number "2".

Figure 6:
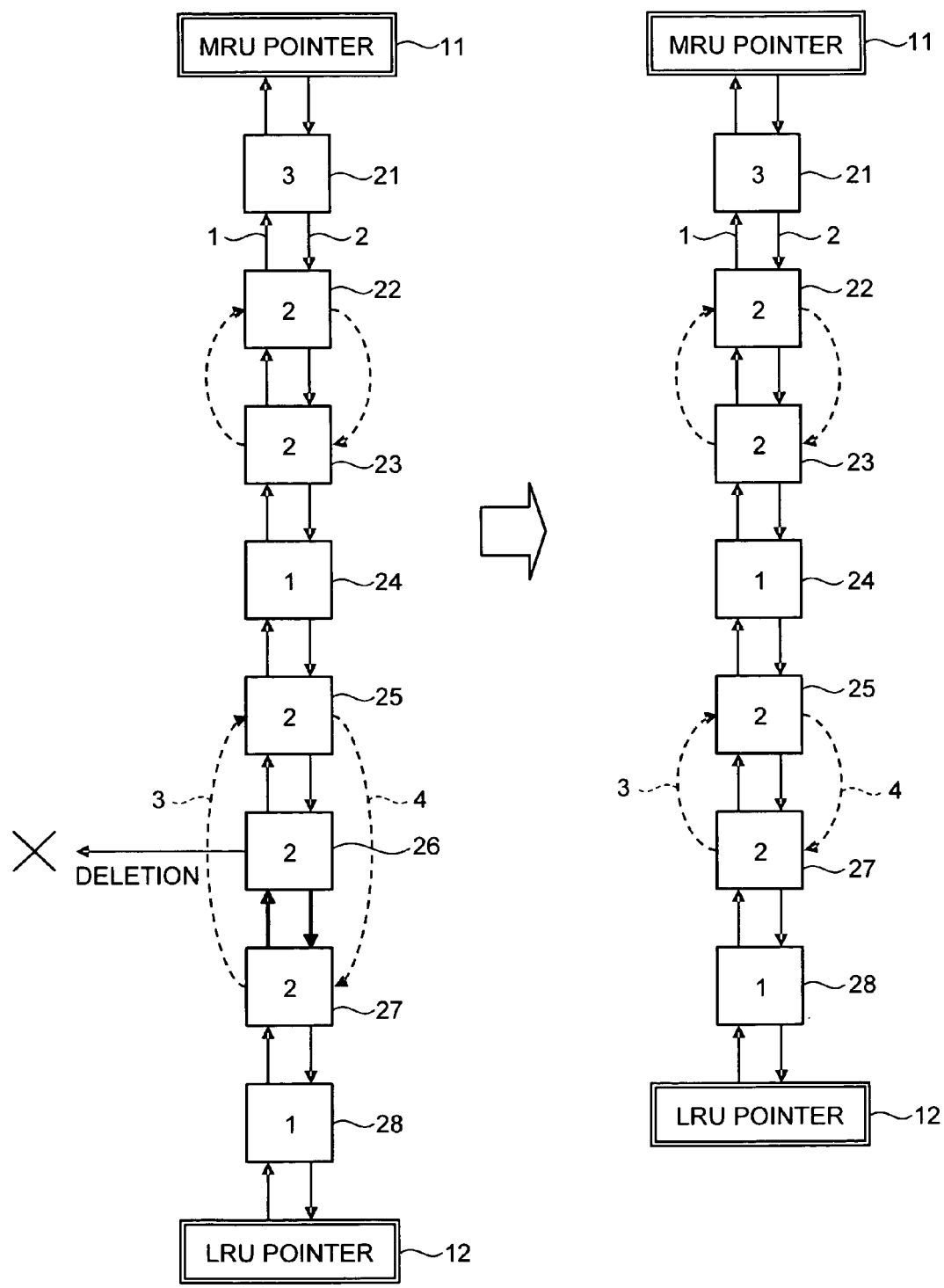
FIG. 6 depicts an operation when deleting a management block from a dirty link.

FIG. 6 depicts an operation when deleting a management block from a dirty link. In FIG. 6, the management block 26 storing a disk number of "2" is deleted from the dirty link shown in FIG. 1.

As shown in the example of. FIG. 6, when one management block in a cluster of management blocks having the same disk numbers is deleted, the skip link between both ends of the cluster is retained unaltered.

When a management block at one end of a cluster of three or more management blocks having the same disk numbers is deleted, a skip link is reset so as to connect the ends of the cluster from which deleted management blocks are excluded. When one of two consecutive management blocks having the same disk numbers is deleted, the skip link set between these management blocks is also deleted.

Figure 7:
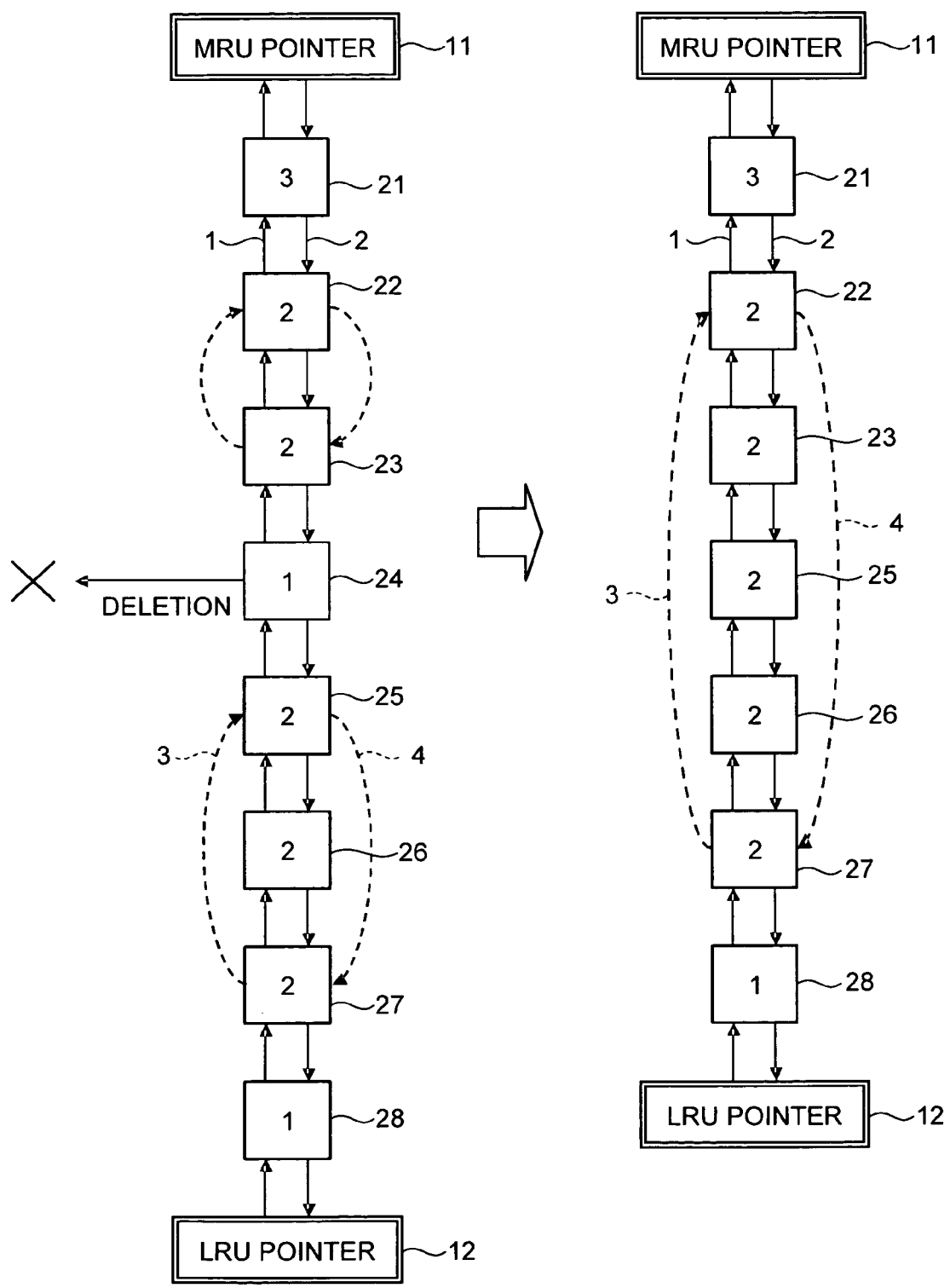
FIG. 7 depicts an operation when coupling of a skip link is performed along with deletion of a management block.

When a management block that does not belong to a cluster of management blocks having the same disk numbers is deleted, the existing skip link is usually retained as it is. However, as shown in FIG. 7, if the management blocks before and after the deleted management block store the same disk numbers, a skip link is set so as to connect both ends of a cluster of management blocks having the same disk numbers that includes these management blocks.

Thus, by setting a skip link for a cluster that links the management blocks before and after a deleted management block, a break in the skip link can be avoided and the dirty link can be more efficiently searched.

Figure 8:
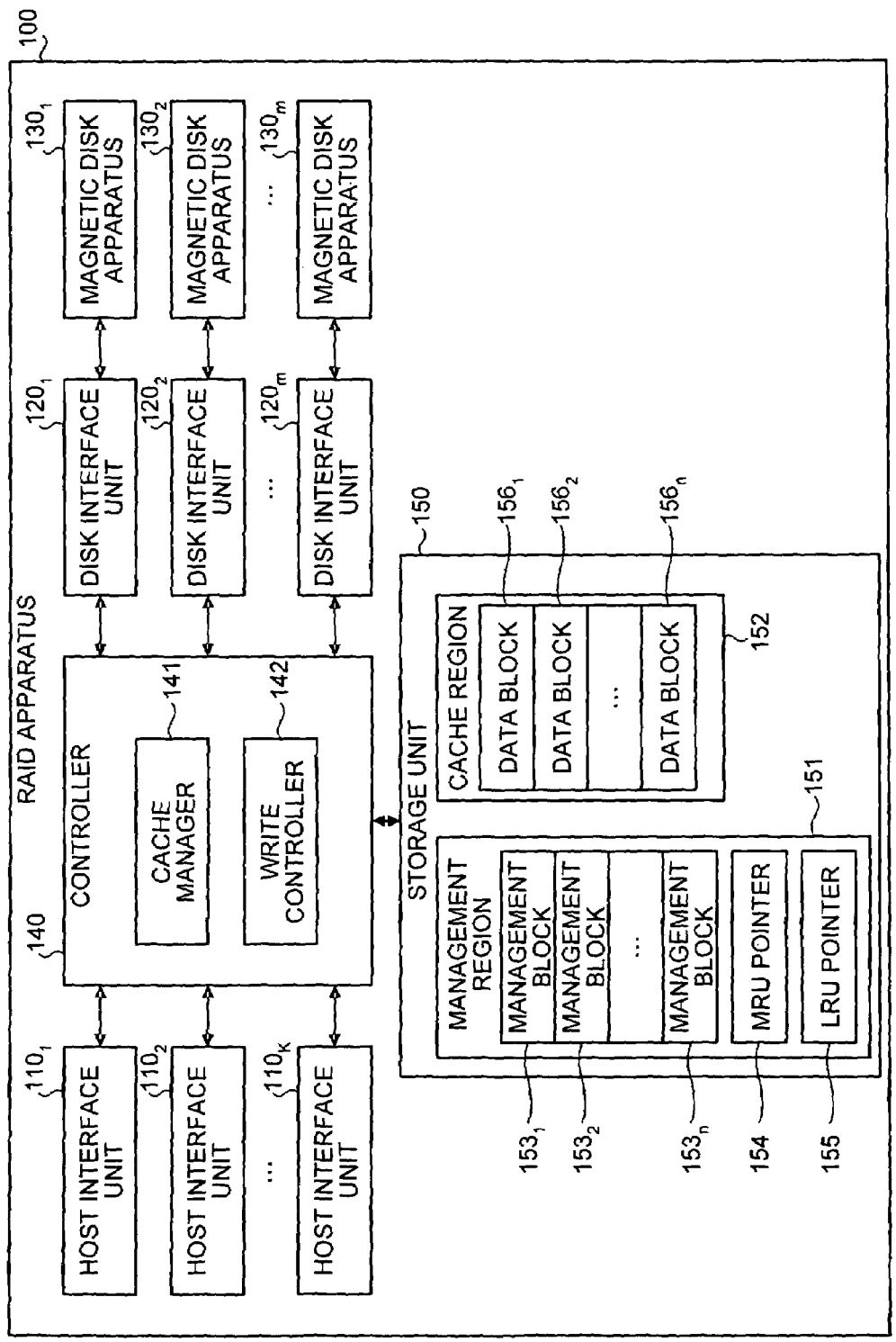
FIG. 8 is a functional block diagram of a configuration of a RAID apparatus according to the present embodiment.

A RAID apparatus 100 incorporating the cache management method according to the present embodiment will be explained next. FIG. 8 is a functional block diagram of a configuration of the RAID apparatus 100. As shown in FIG. 8, the RAID apparatus 100 includes host interface units $110_1$ to $110_k$, disk interface units $120_1$ to $120_m$, magnetic disk apparatuses $130_1$ to $130_m$, a controller 140, and a storage unit 150.

The host interface units $110_1$ to $110_k$ exchange various information with a host that requests writing and reading of data blocks to and from the RAID apparatus. The RAID apparatus and the host can be connected using various methods, such as using a fiber channel. An arbitrary number of the host interface units $110_1$ to $110_k$ can be provided.

The disk interface units $120_1$ to $120_m$ connect the magnetic disk apparatuses $130_1$ to $130_m$, and the magnetic disk apparatuses $130_1$ to $130_m$ are storage apparatuses that can store various information. An arbitrary number of the disk interface units $120_1$ to $120_m$ and the magnetic disk apparatuses $130_1$ to $130_m$ can be provided.

The controller 140 controls the RAID apparatus 100, and is connected to the host interface units $110_1$ to $110_k$, the disk interface units $120_1$ to $120_m$, and the storage unit 150. The controller 140 includes a cache manager 141 and a write controller 142.

The controller 140 executes control processes required for reading/writing information according to various types of RAID methods such as RAID 5. The controller 140 also makes effective use of a cache provided in the storage unit 150 so as to reduce the time taken in replying to requests from the host.

The cache manager 141 is a processor that manages the status of a cache provided in the storage unit 150, and also manages the dirty link described above. The write controller 142 is a processor that executes a write process of a data block which the host has made a write request for but which has not yet been written to the magnetic disk apparatuses $130_1$ to $130_m$.

The write controller 142 searches the dirty link managed by the cache manager 141 to select a data block as a target for the write process. At this time, a skip link is used to skip through management blocks corresponding to magnetic disk apparatuses with high loads. The write process performed by the write controller 142 is activated, for example, when the capacity of the cache provided in the storage unit 150 is tight, and at prescheduled time intervals.

The storage unit 150 is a high-speed storage apparatus including a random access memory (RAM) or the like, and includes management blocks $153_1$ to $153_n$, a management region 151 that sores an MRU pointer 154 and an LRU pointer 155, and a cache region 152 that stores data blocks $156_1$ to $156_n$.

Figure 9:
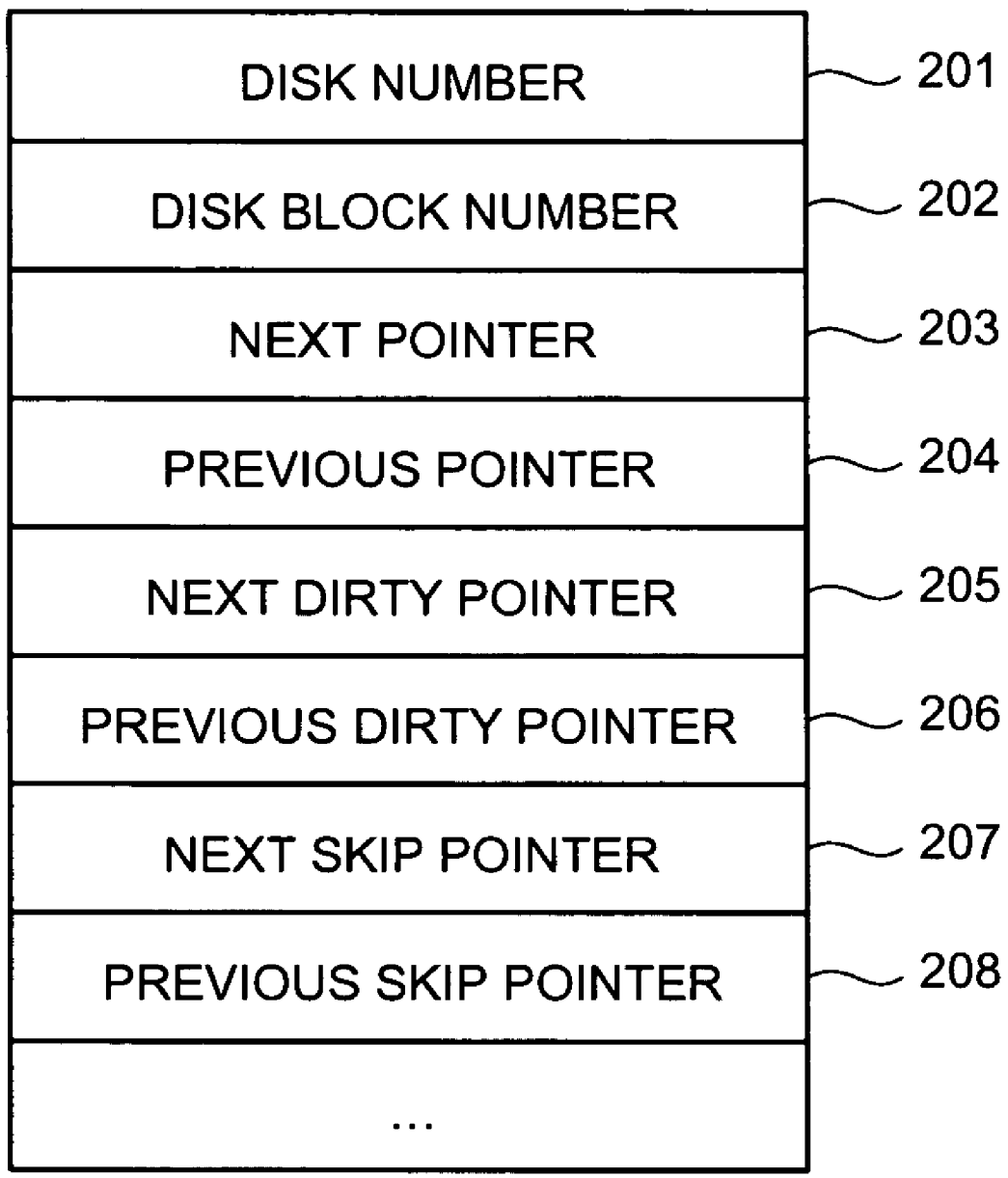
FIG. 9 is an example of management information stored by a management block.

The data blocks $156_1$ to $156_n$ are temporary copies of data blocks to be stored by the magnetic disk apparatuses $130_1$ to $130_m$. The management blocks $153_1$ to $153_n$ correspond one-to-one to the data blocks $156_1$ to $156_n$, and each stores management information of its corresponding data block. FIG. 9 is an example of management information stored by the management block $153_1$. The management blocks $153_2$ to $153_n$ store information similar to that of the management block $153_1$.

The management block $153_1$ in FIG. 9 includes these items such as a disk number 201, a disk block number 202, a next pointer 203, a previous pointer 204, a next dirty pointer 205, a previous dirty pointer 206, a next skip pointer 207, and a previous skip pointer 208.

The disk number 201 is set to identify a magnetic disk apparatus that a data block corresponding to the management block should be stored in. The disk block number 202 is set to identify a position where the data block corresponding to the management block should be stored in the magnetic disk apparatus identified by the disk number 201.

The next pointer 203 and the previous pointer 204 are items for making a list of the management blocks $153_1$ to $153_n$ in the order of the data blocks for which the host recently requested access, irrespective of whether they are write requests or read requests, and include numbers for identifying management blocks to be arranged before and after in this list. Since links established by the next pointer 203 and the previous pointer 204 are achieved by a conventional technique, and detailed explanation thereof will be omitted in this specification.

The next dirty pointer 205 and the previous dirty pointer 206 are items for forming a dirty link, and include numbers for identifying management blocks arranged before and after in the dirty link. The arrangement of the management blocks in the dirty link is changed by changing the values of these items.

The next skip pointer 207 and the previous skip pointer 208 are items for forming a skip link that connects both ends of a cluster of management blocks storing same values as the disk numbers 201 in the dirty link, and include numbers for identifying management blocks positioned at another end of the skip link.

An operation of the RAID apparatus 100 in FIG. 8 will be explained next. To simplify explanation of this process procedure, it is assumed that a management block that is not consecutive with other management blocks storing the same disk numbers has a skip link that points to itself.

Figure 10:
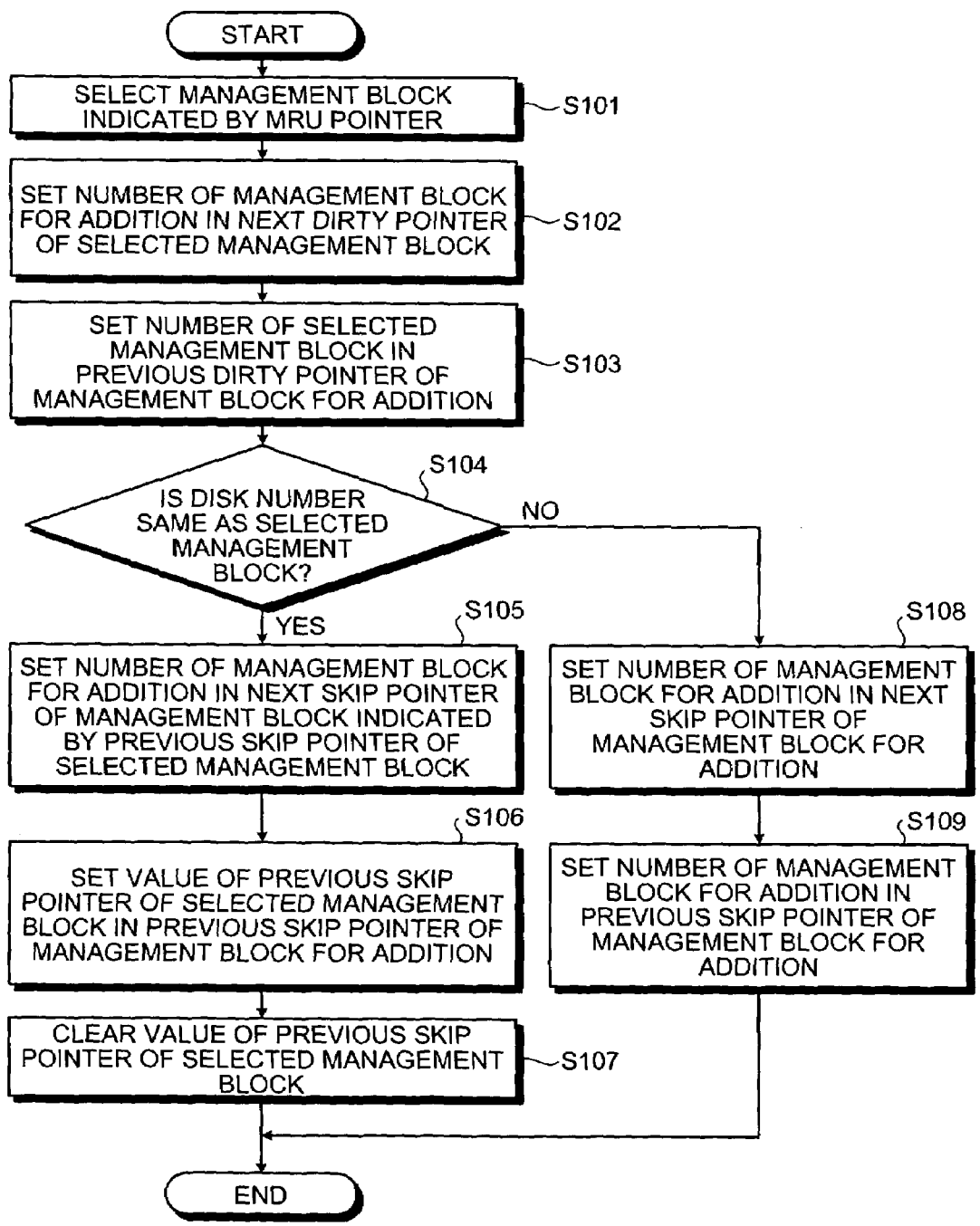
FIG. 10 is a flowchart of a process procedure when adding a management block to a dirty link.

FIG. 10 is a flowchart of a process procedure when adding a management block to a dirty link. As shown in FIG. 10, when it becomes necessary to add a management block to the dirty link, the cache manager 141 selects a management block indicated by the MRU pointer 154, that is, a management block corresponding to a data block for which a write request has been made most recently (step S101).

The number of the management block for addition is then set in the next dirty pointer 205 of the selected management block (step S102), and the number of the selected management block is set in the previous dirty pointer 206 of the management block for addition (step S103).

After connecting the management block for addition to the dirty link in this way, if the value of the disk number 201 of the management block for addition is the same as the value of the disk number 201 of the selected management block (step S104: Yes), a process is performed to change the skip link set in the selected management block to the management block for addition.

That is, the number of the management block for addition is set in the next skip pointer 207 of the management block indicated by the previous skip pointer 208 of the selected management block (step S105), the value of the previous skip pointer 208 of the selected management block is set in the previous skip pointer 208 of the management block for addition (step S106), and the value of the previous skip pointer 208 of the selected management block is cleared (step S107).

On the other hand, if the value of the disk number 201 of the management block for addition is not the same as the value of the disk number 201 of the selected management block (step S104: No), the number of the management block for addition is set in its own next skip pointer 207 (step S108), and the number of the management block for addition is set in its own previous skip pointer 208 (step S109).

Figure 11:
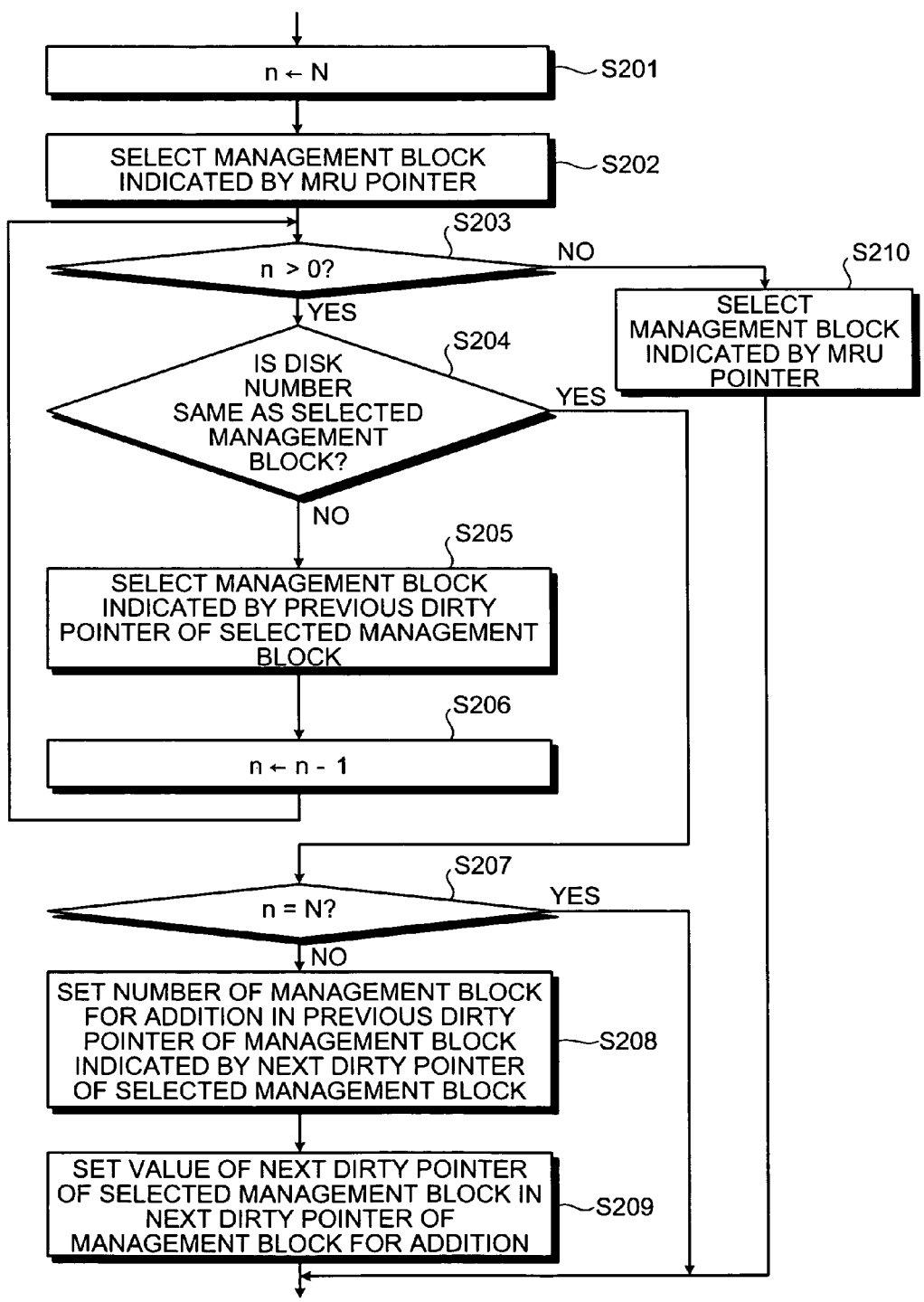
FIG. 11 is a flowchart of a process procedure when inserting a management block to a dirty link.

While the above process procedure uses the position indicated by the MRU pointer 154 as the position for adding the management block, as shown in FIG. 5, it is also possible to achieve a process procedure when inserting a management block midway along the dirty link by replacing step S101 in FIG. 10 with a process shown in FIG. 11, with the aim of increasing opportunities for setting skip links.

In this case, the cache manager 141 sets a value of a counter n to N, being the largest logic block number for searching for management blocks having the same disk numbers (step S201), and selects the management block indicated by the MRU pointer 154, that is, the management block that corresponding to a data block for which a write request has been made most recently (step S202).

When the value of the counter n is greater than zero (step S203: Yes), the value of the disk number 201 of the management block for addition is compared with the value of the disk number 201 of the selected management block to confirm whether the position of the selected management block is the insertion position of the management block for addition.

If the two values are not the same, that is, if the position of the selected management block is not the insertion position of the management block for addition (step S204: No), the cache manager 141 selects the management block indicated by the previous dirty pointer 206 of the selected management block (step S205), subtracts 1 from the value of the counter n (step S206), and restarts processing from step S203.

On the other hand, if the two values are the same, that is, if the position of the selected management block is the insertion position of the management block for addition (step S204: Yes), the value of the counter n is confirmed. When the value of the counter n remains at its initial value N, that is, when the insertion position is the terminus of the dirty list on the MRU pointer 154 side (step S207: Yes), the cache manager 141 shifts to step S102 without further processing.

When the value of the counter n differs from N, that is, when the insertion position is not the terminus of the dirty list on the MRU pointer 154 side (step S207: No), in order to connect the management block for addition to the management block on the MRU pointer side of the selected management block, the number of the management block for addition is set in the previous dirty pointer 206 of the management block indicated by the next dirty pointer 205 of the selected management block (step S208), the value of the next dirty pointer 205 of the selected management block is set in the next dirty pointer 205 of the management block for addition (step S209), and processing then shifts to step S102.

When the value of the counter n is less than zero in step S203, that is, when a management block having the same disk number cannot be found (step S203: No), the management block indicated by the MRU pointer 154 is selected (step S210), and processing then shifts to step S102.

Figure 12:
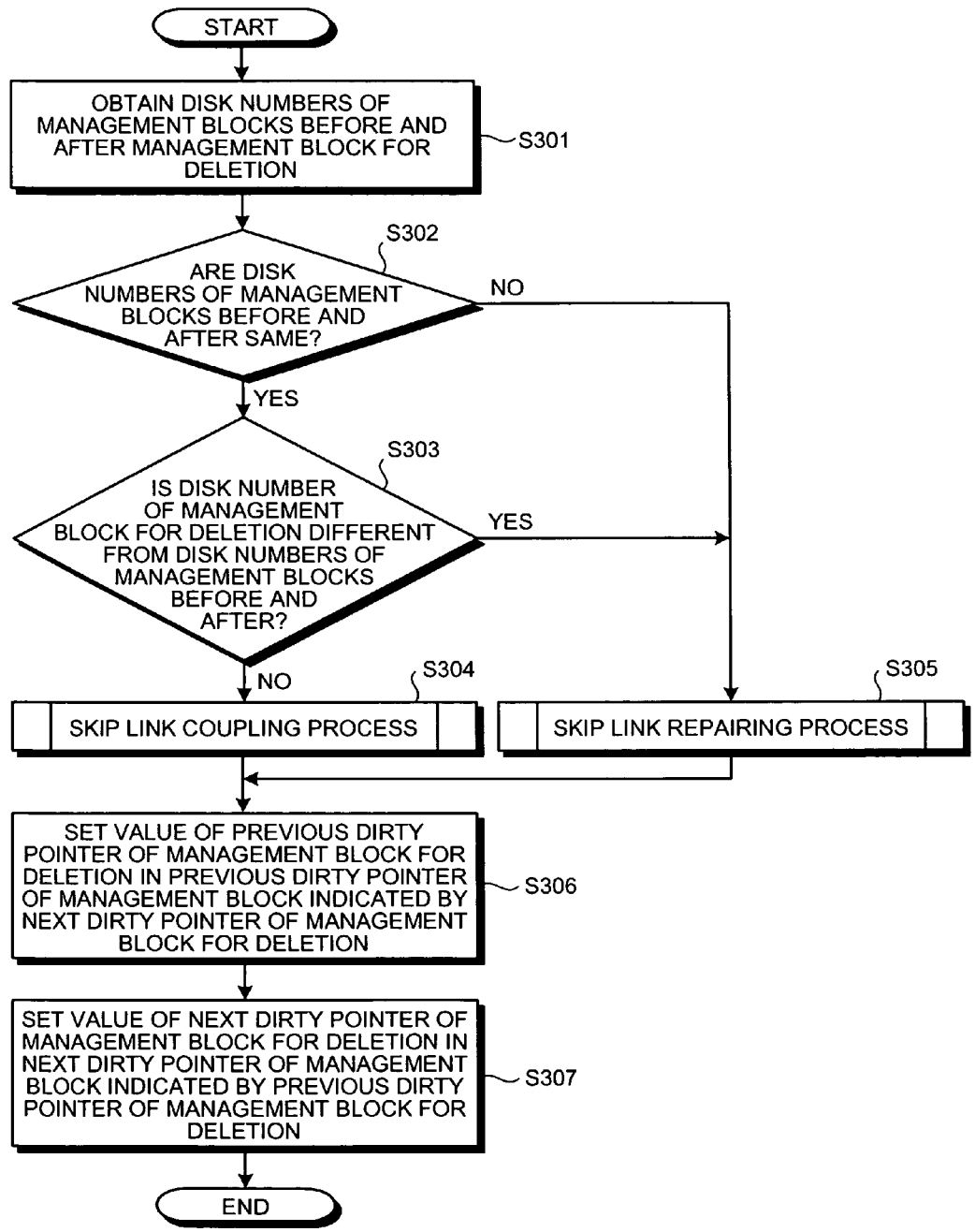
FIG. 12 is a flowchart of a process procedure when deleting a management block from a dirty link.

FIG. 12 is a flowchart of a process procedure when deleting a management block from a dirty link. As shown in FIG. 12, when it becomes necessary to delete a management block from the dirty link, the cache manager 141 obtains the values of the disk numbers 201 of the management blocks before and after the management block for deletion (step S301).

When the values of the disk numbers 201 of the management blocks before and after are the same (step S302: Yes) and the value of the disk number 201 of the management block for deletion is different from the values of the disk numbers 201 of the management blocks before and after (step S303: No), a skip link coupling process explained below is executed to couple a skip link that includes the management blocks before and after (step S304). On the other hand, when the values of the disk numbers 201 of the management blocks before and after are different (step S302: No), or when the value of the disk number 201 of the management block for deletion is the same as the values of the disk numbers 201 of the management blocks before and after (step S303: Yes), a skip link repairing process explained below is executed (step S305).

To remove the management block for deletion from the dirty link, the value of the previous dirty pointer 206 of the management block for deletion is set in the previous dirty pointer 206 of the management block indicated by the next dirty pointer 205 of the management block for deletion (step S306), and the value of the next dirty pointer 205 of the management block for deletion is set in the next dirty pointer 205 of the management block indicated by the previous dirty pointer 206 of the management block for deletion (step S307).

Figure 13:
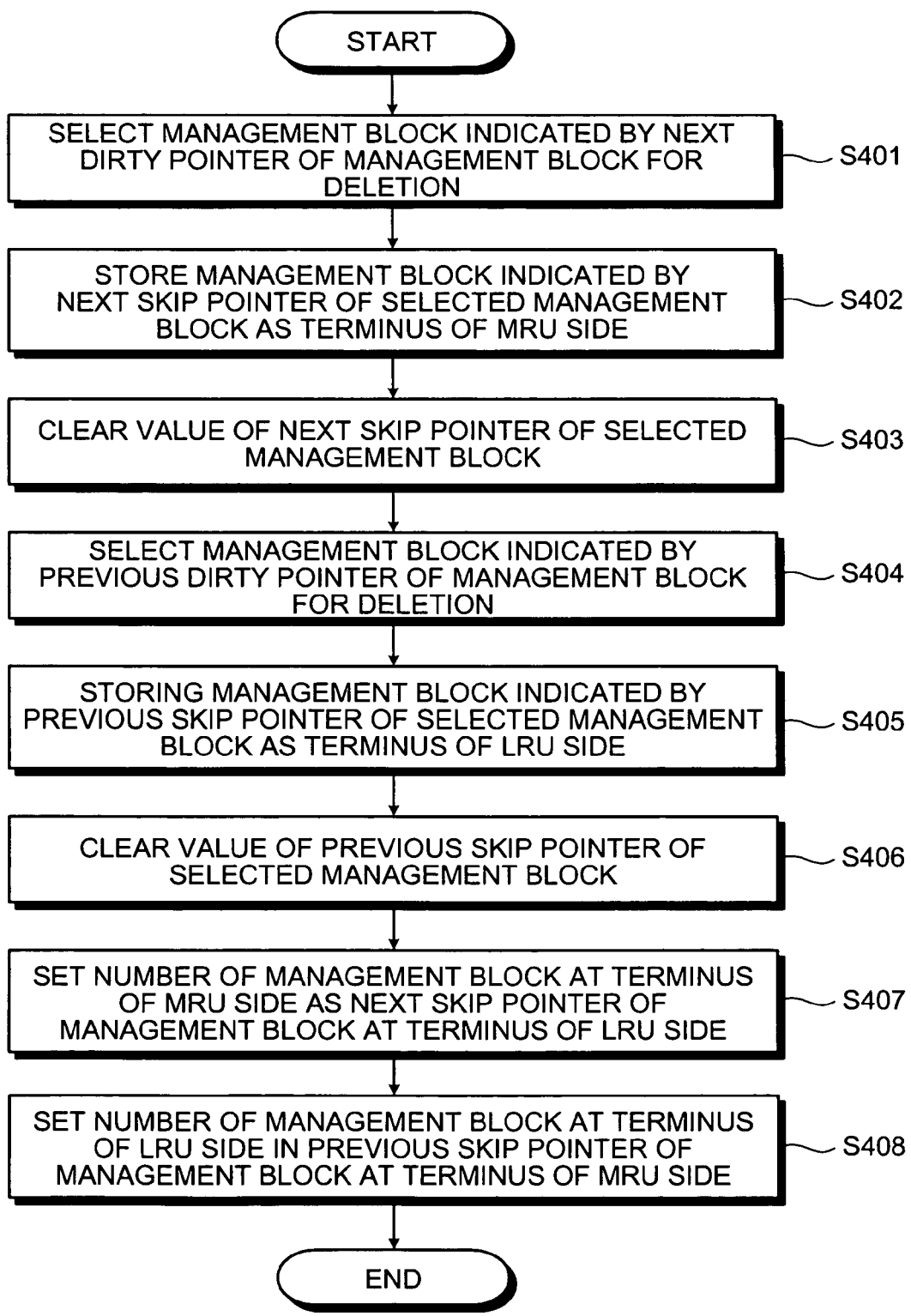
FIG. 13 is a flowchart of a skip link coupling process procedure.

FIG. 13 is a flowchart of a skip link coupling process procedure. As shown in FIG. 13, the cache manager 141 selects a management block indicated by the next dirty pointer 205 of the management block for deletion (step S401), and, after storing the management block indicated by the next skip pointer 207 of the selected management block as the management block at the terminus of the MRU side (step S402), clears the value of the next skip pointer 207 of the selected management block (step S403).

The cache manager 141 selects the management block indicated by the previous dirty pointer 206 of the management block for deletion (step S404), and, after storing the management block indicated by the previous skip pointer 208 of the selected management block as the management block at the terminus of the LRU side (step S405), clears the value of the previous skip pointer 208 of the selected management block (step S406).

The number of the management block stored as the terminus on the MRU side is then set as the next skip pointer 207 of the management block stored as the terminus on the LRU side (step S407), and the number of the management block stored as the terminus on the LRU side is set in the previous skip pointer 208 of the management block stored as the terminus on the MRU side (step S408).

Figure 14:
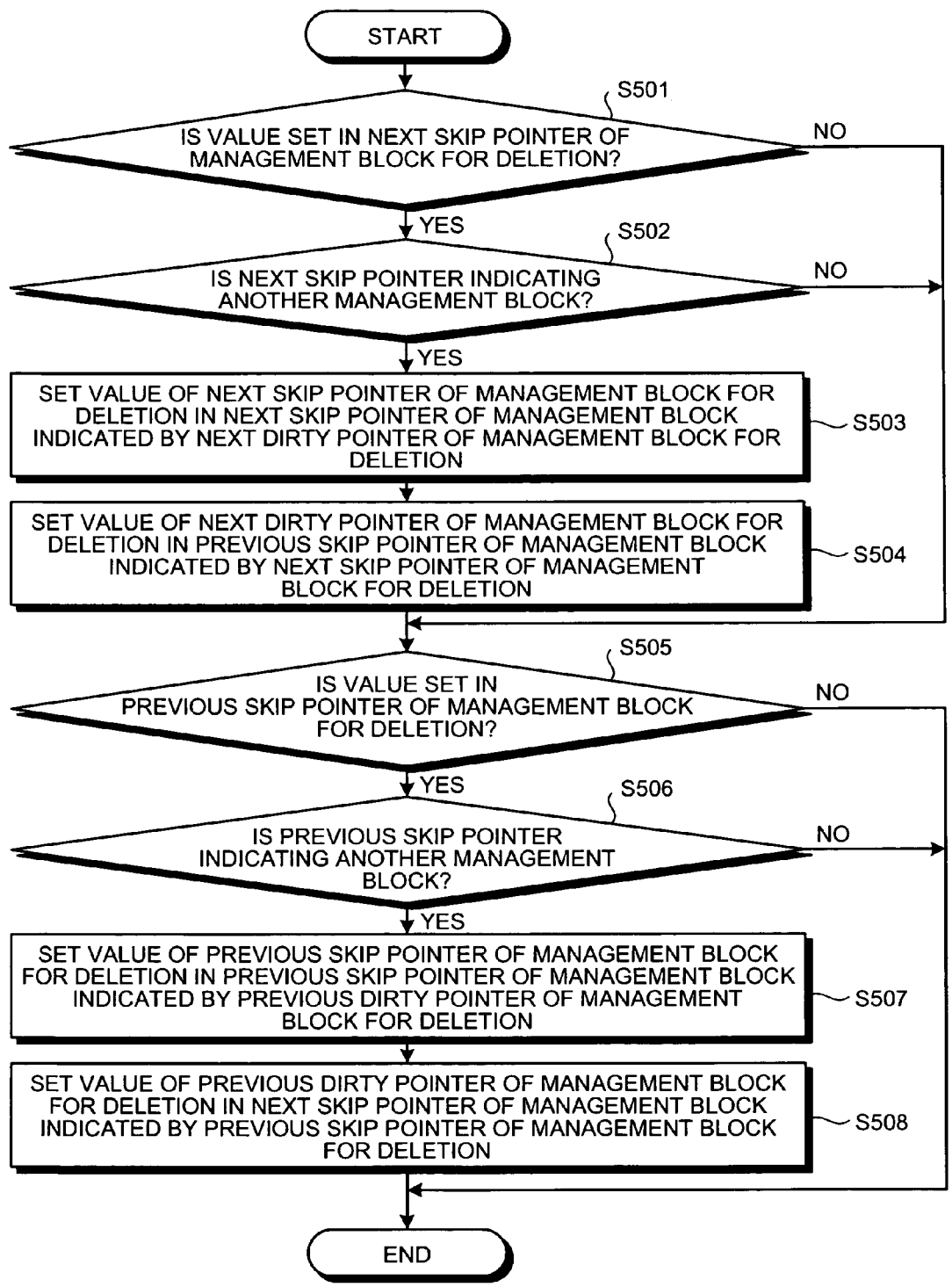
FIG. 14 is a flowchart of a skip link repairing process procedure.

FIG. 14 is a flowchart of a skip link repairing process procedure. As shown in FIG. 14, when a value is set in the next skip pointer 207 of the management block for deletion (step S501: Yes) and the next skip pointer 207 is indicating a management block other than the management block for deletion (step S502: Yes), the cache manager 141 sets the value of the next skip pointer 207 of the management block for deletion in the next skip pointer 207 of the management block indicated by the next dirty pointer 205 of the management block for deletion (step S503), and sets the value of the next dirty pointer 205 of the management block for deletion in the previous skip pointer 208 of the management block indicated by the next skip pointer 207 of the management block for deletion (step S504).

Furthermore, when a value is set in the previous skip pointer 208 of the management block for deletion (step S505: Yes) and the previous skip pointer 208 is indicating a management block other than the management block for deletion (step S506: Yes), the cache manager 141 sets the value of the previous skip pointer 208 of the management block for deletion in the previous skip pointer 208 of the management block indicated by the previous dirty pointer 206 of the management block for deletion (step S507), and in addition, sets the value of the previous dirty pointer 206 of the management block for deletion in the next skip pointer 207 of the management block indicated by the previous skip pointer 208 of the management block for deletion (step S508).

Figure 15:
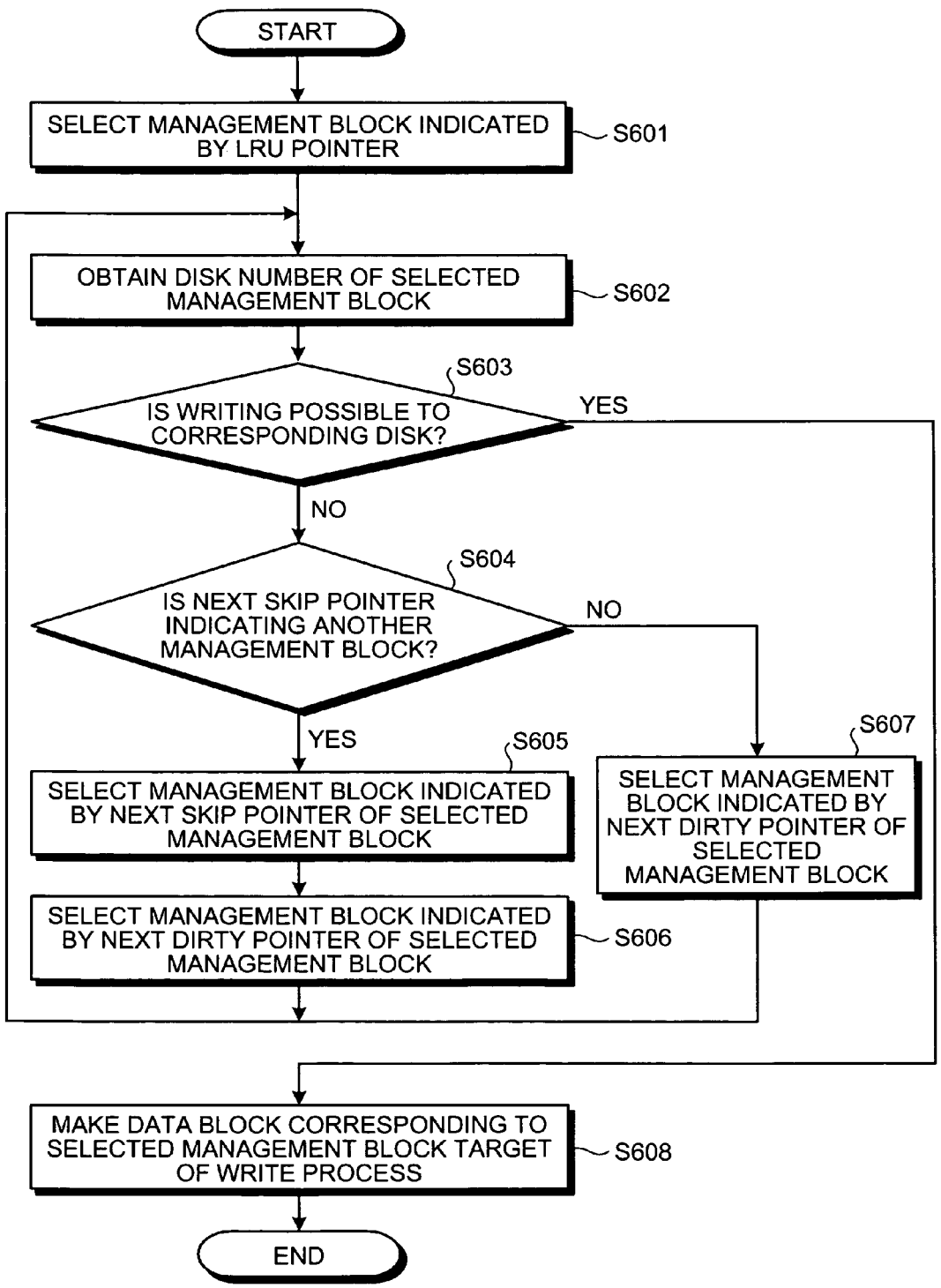
FIG. 15 is a flowchart of a process procedure when selecting a data block as a target of a write process.

FIG. 15 is a flowchart of a process procedure when selecting a data block as a target of a write process. Note that FIG. 15 depicts a process procedure when selecting only one data block as a target of a write process.

As shown in FIG. 15, when it becomes necessary to select a data block as a target of a write process, the write controller 142 selects a management block indicated by the LRU pointer 155 (step S601).

The write controller 142 obtains the value of the disk number 201 of the selected management block (step S602), and, if the magnetic disk apparatus corresponding to that number is in a writable state (step S603: Yes), selects a data block corresponding to the selected management block as the target of the write process (step S608).

Furthermore, when the magnetic disk apparatus corresponding to the obtained number is not in a writable state due to having a high load or the like (step S603: No), if the next skip pointer 207 of the selected management block is indicating a management block other than the selected management block (step S604: Yes), the write controller 142 selects the management block indicated by the next skip pointer 207 of the selected management block (step S605), and selects the management block indicated by the previous dirty pointer 206 of the selected management block (step S606) before restarting the process from step S602.

When the magnetic disk apparatus is not in a writable state due to having a high load or the like (step S603: No) and the next skip pointer 207 of the selected management block is indicating the selected management block itself (step S604: No), the write controller 142 selects the management block indicated by the next dirty pointer 205 of the selected management block (step S607), and then restarts the process from step S602.

The configuration of the RAID apparatus 100 according to the present embodiment shown in FIG. 8 can be modified in various ways without departing from the spirit or scope of the present invention. For example, a configuration achieved by removing the host interface units $110_1$ to $110_k$ and the magnetic disk apparatuses $130_1$ to $130_m$ from the configuration of the RAID apparatus 100 of FIG. 8 can be mounted on a single substrate, and configured as a RAID control apparatus that can be incorporated in a server apparatus or the like.

Furthermore, the functions of the controller 140 of the RAID apparatus 100 can be mounted as software to achieve a so-called software RAID. An example of a computer that executes a RAID control program 1072 achieved by mounting the functions of the controller 140 as software will be explained below.

Figure 16:
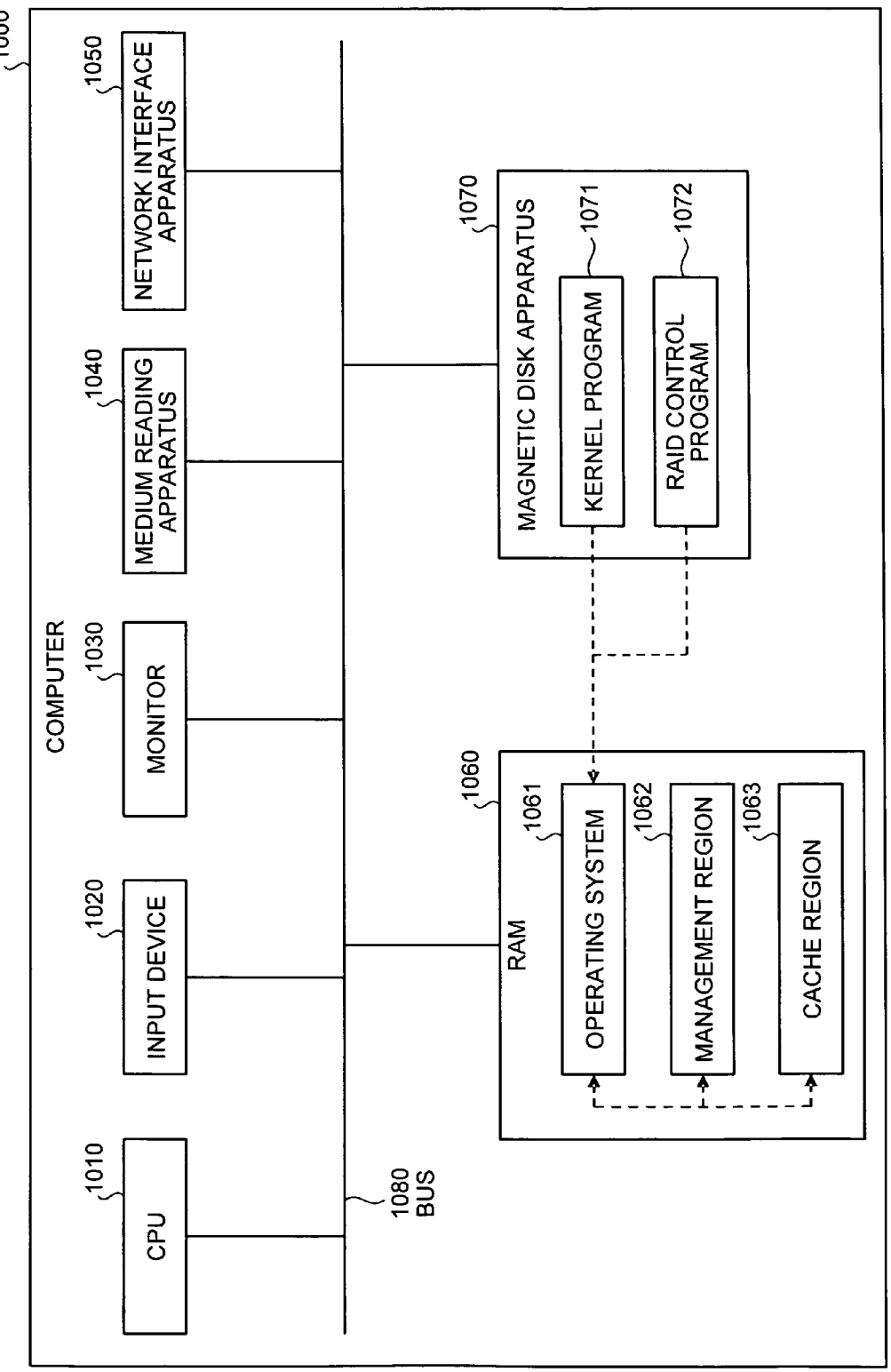
FIG. 16 is a functional block diagram of a computer that executes a RAID control program.

FIG. 16 is a functional block diagram of a computer 1000 that executes the RAID control program 1072. The computer 1000 includes a CPU 1010 that executes various types of operational processes, an input device 1020 that receives data input by a user, a monitor 1030 that displays various types of information, a medium reading apparatus 1040 that reads programs and the like from a recording medium that stores various programs, a network interface apparatus 1050 that exchanges data with other computers via a network, a RAM 1060 that temporarily stores various types of information, and a magnetic disk apparatus 1070, these being connected by a bus 1080.

The magnetic disk apparatus 1070 stores a kernel program 1071 that constitutes the entity of an operating system 1061 that performs basic control of the computer 1000, and the RAID control program 1072 including similar functions to those of the controller 140 shown in FIG. 8. To achieve a RAID configuration, the computer 1000 includes a plurality of magnetic disk apparatuses in addition to the magnetic disk apparatus 1070 shown in FIG. 16.

The CPU 1010 reads the kernel program 1071 from the magnetic disk apparatus 1070 and expands it into the RAM 1060; thereby the kernel program 1071 functions as the operating system 1061. To achieve a RAID function, the operating system 1061 reads the RAID control program 1072 from the magnetic disk apparatus 1070 and expands it into the RAM 1060, thereby making it function as part of itself.

Thus, the operating system 1061 incorporating the RAID control program 1072 in itself provides a management region 1062 corresponding to the management region 151 shown in FIG. 8, and a cache region 1063 corresponding to the cache region 152, and uses these regions in executing various types of data processes using RAID functions.

The RAID control program 1072 need not be stored in the magnetic disk apparatus 1070. Instead, it can be executed by making the computer 1000 read a program stored in a recording medium such as a compact disc read only memory (CD-ROM). The program can also be stored in another computer (or server) that is connected to the computer 1000 via a public line, the Internet, a local area network (LAN), a wide area network (WAN), and the like, and executed by making the computer 1000 read the program from the computer.

As described above, according to the present embodiment, when selecting a data block as a target of a write process by searching a dirty link that arranges management blocks corresponding to data blocks that need to be written to a magnetic disk in order of priority, if there is a skip link at a management block corresponding to a data block whose write destination is a magnetic disk that cannot be written to, this skip link is followed such that it becomes possible to skip through managements block corresponding to data blocks whose write destinations are magnetic disks that cannot be written to. Therefore, when it becomes necessary to manage many data blocks due to an increased cache capacity, the cache can be managed efficiently while suppressing any increase in the processing time for managing the cache.

While the present embodiment describes an example where the cache management method according to the present invention is applied in managing a cache in a RAID apparatus, the cache management method of the present invention can be applied in various types of apparatuses and methods using caches.

As described above, according to an embodiment of the present invention, when selecting a data block as a write target by searching a list where elements corresponding to data blocks that need to be written to a magnetic disk are arranged in order of priority, if there is a link at an element corresponding to a data block whose write destination is a magnetic disk that cannot be written to, this link is followed such that it becomes possible to skip through a group of elements corresponding to data blocks whose write destinations are magnetic disks that cannot be written to. Therefore, when it becomes necessary to manage many data blocks due to an increased cache capacity, the cache can be managed efficiently while suppressing any increase in the processing time for managing the cache.

Furthermore, according to an embodiment of the present invention, when deleting an element from the list, if the write destinations of data blocks corresponding to the elements before and after the element for deletion are the same magnetic disk apparatus, a link including them is established between both ends of elements whose data block write destinations are the same magnetic disk apparatus. This prevents the link from being fragmented, and can suppress an increase in the processing time for managing the cache.

Moreover, according to an embodiment of the present invention, when inserting an element into the list, it is inserting at a position where there are consecutive elements whose data block write destinations are the same magnetic disk apparatus. This prevents the link from being fragmented, and can suppress an increase in the processing time for managing the cache.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A redundant-arrays-of-independent-disks apparatus that temporarily stores a data block to be written to a magnetic disk apparatus in a cache, the redundant-arrays-of-independent-disks apparatus comprising:
a cache managing unit that creates a list in which elements corresponding to each data block is arranged according to a priority for writing the data blocks temporarily stored in the cache to the magnetic disk apparatus, and when a group of consecutive elements corresponding to data blocks to be written to a same magnetic disk apparatus exists in the list, provides a link that connects elements at both ends of the group, each of the both ends of the group being arranged between the group and an element corresponding to a data block to be written to a different magnetic disk apparatus from the same magnetic disk apparatus; and
a write control unit that searches, upon selecting a data block as a target for writing to the magnetic disk apparatus, the elements belonging to the list in descending order of priority, and if a link is set at an element corresponding to a data block of which a write destination is a magnetic disk that cannot perform a writing, follows the link to search a subsequent element.

2. The redundant-arrays-of-independent-disks apparatus according to claim 1, wherein
upon deleting an element from the list, if write destinations of data blocks corresponding to elements before and after the element to be deleted are a same magnetic disk apparatus, the cache managing unit provides a link that connects elements at both ends of a group of elements corresponding to data blocks to be written to the same magnetic disk apparatus, the group including the elements before and after the element to be deleted.

3. The redundant-arrays-of-independent-disks apparatus according to claim 1, wherein
upon inserting an element into the list, the cache managing unit searches elements belonging to the list in ascending order of priority, and deems an insertion position of the element for insertion to be immediately before an element corresponding to a data block written to a same magnetic disk apparatus as a magnetic disk apparatus to which the data block corresponding to the element for insertion is written.

4. A computer-readable recording medium that stores a computer program for controlling a redundant-arrays-of-independent-disks apparatus, wherein the computer program causes a computer to execute:
cache managing including
creating a list in which elements corresponding to each data block is arranged according to a priority for writing the data blocks temporarily stored in the cache to the magnetic disk apparatus; and
providing, when a group of consecutive elements corresponding to data blocks to be written to a same magnetic disk apparatus exists in the list, a link that connects elements at both ends of the group, each of the both ends of the group being arranged between the group and an element corresponding to a data block to be written to a different magnetic disk apparatus from the same magnetic disk apparatus; and
write controlling including
searching, upon selecting a data block as a target for writing to the magnetic disk apparatus, the elements belonging to the list in descending order of priority; and
following, if a link is set at an element corresponding to a data block of which a write destination is a magnetic disk that cannot perform a writing, the link to search a subsequent element.

5. The computer-readable recording medium according to claim 4, wherein
upon deleting an element from the list, if write destinations of data blocks corresponding to elements before and after the element to be deleted are a same magnetic disk apparatus, the cache managing includes providing a link that connects elements at both ends of a group of elements corresponding to data blocks to be written to the same magnetic disk apparatus, the group including the elements before and after the element to be deleted.

6. The computer-readable recording medium according to claim 4, wherein
upon inserting an element into the list, the cache managing includes
searching elements belonging to the list in ascending order of priority; and
deeming an insertion position of the element for insertion to be immediately before an element corresponding to a data block written to a same magnetic disk apparatus as a magnetic disk apparatus to which the data block corresponding to the element for insertion is written.

7. A method of managing a cache that temporarily stores a data block to be written to a magnetic disk apparatus, the method comprising:

list organizing including
  creating a list in which elements corresponding to each data block is arranged according to a priority for writing the data blocks temporarily stored in the cache to the magnetic disk apparatus; and
  providing, when a group of consecutive elements corresponding to data blocks to be written to a same magnetic disk apparatus exists in the list, a link that connects elements at both ends of the group, each of the both ends of the group being arranged between the group and an element corresponding to a data block to be written to a different magnetic disk apparatus from the same magnetic disk apparatus; and write controlling including
  searching, upon selecting a data block as a target for writing to the magnetic disk apparatus, the elements belonging to the list in descending order of priority; and
  following, if a link is set at an element corresponding to a data block of which a write destination is a magnetic disk that cannot perform a writing, the link to search a subsequent element.

8. The method according to claim 7, wherein
upon deleting an element from the list, if write destinations of data blocks corresponding to elements before and after the element to be deleted are a same magnetic disk apparatus, the list organizing includes providing a link that connects elements at both ends of a group of elements corresponding to data blocks to be written to the same magnetic disk apparatus, the group including the elements before and after the element to be deleted.

9. The method according to claim 7, wherein
upon inserting an element into the list, the list organizing includes
  searching elements belonging to the list in ascending order of priority; and
  deeming an insertion position of the element for insertion to be immediately before an element corresponding to a data block written to a same magnetic disk apparatus as a magnetic disk apparatus to which the data block corresponding to the element for insertion is written.

* * * * *